United States Patent
Anvekar et al.

(10) Patent No.: US 6,834,796 B2
(45) Date of Patent: Dec. 28, 2004

(54) ANONYMOUS REDEMPTION AND STORED VALUE SYSTEM AND METHOD

(75) Inventors: Dinesh Kashinath Anvekar, Colonia, NJ (US); Bhaskarpillai Gopinath, Watchung, NJ (US); Sridhar Sundaram, Highland Park, NJ (US); Rajiv Mangla, New Delhi (IN)

(73) Assignee: Level Z, L.L.C., Piscataway, NJ (US)

( * ) Notice: Subject to any disclaimer, the term of this patent is extended or adjusted under 35 U.S.C. 154(b) by 8 days.

(21) Appl. No.: 10/224,080

(22) Filed: Aug. 20, 2002

(65) Prior Publication Data

US 2002/0190123 A1 Dec. 19, 2002

Related U.S. Application Data

(63) Continuation-in-part of application No. 09/652,932, filed on Aug. 31, 2000, now abandoned.

(51) Int. Cl.[7] .............................................. G06K 5/00
(52) U.S. Cl. ................................... 235/380; 235/379
(58) Field of Search ................................. 235/379, 380, 235/382, 385, 487, 492; 705/17, 28, 41

(56) References Cited

U.S. PATENT DOCUMENTS

| | | | |
|---|---|---|---|
| 4,977,595 A | | 12/1990 | Ohta et al. |
| 5,030,806 A | * | 7/1991 | Collin .......................... 235/375 |
| 5,546,523 A | | 8/1996 | Gatto |
| 5,644,118 A | | 7/1997 | Hayashida |
| 5,892,213 A | * | 4/1999 | Ito et al. ...................... 235/441 |
| 5,903,633 A | | 5/1999 | Lorsch |
| 5,914,472 A | * | 6/1999 | Foladare et al. ............. 235/380 |
| 5,952,639 A | | 9/1999 | Ohki et al. |
| 5,953,710 A | * | 9/1999 | Fleming ........................ 705/38 |
| 6,032,857 A | | 3/2000 | Kitagawa et al. |
| 6,052,675 A | * | 4/2000 | Checchio ....................... 705/44 |
| 6,095,411 A | * | 8/2000 | Schrenk ....................... 235/380 |
| 6,173,272 B1 | | 1/2001 | Thomas et al. |
| 6,213,390 B1 | | 4/2001 | Oneda |
| 6,320,947 B1 | * | 11/2001 | Joyce et al. .................. 379/144 |
| 6,352,205 B1 | | 3/2002 | Mullins et al. |
| 6,366,894 B1 | | 4/2002 | Everett et al. |
| 6,394,343 B1 | * | 5/2002 | Berg et al. ................... 235/379 |
| 6,473,500 B1 | * | 10/2002 | Risafi et al. ................. 235/379 |
| 6,597,776 B1 | * | 7/2003 | Walker et al. ............. 379/114.26 |
| 6,615,189 B1 | * | 9/2003 | Phillips et al. ................. 705/41 |

FOREIGN PATENT DOCUMENTS

JP            401145798    *  6/1989    ............. G07F/7/08

* cited by examiner

*Primary Examiner*—Daniel Stcyr
(74) *Attorney, Agent, or Firm*—John T. Peoples

(57) ABSTRACT

A stored value commerce system and method enabling the anonymous creation and usage of stored value accounts for purchase of goods and/or services, including the anonymous redemption of a value up to a maximum of the balance value associated with a stored value account.

32 Claims, 13 Drawing Sheets

| SVCH IDENTIFIER (PIN) 310 | SVCH TOTAL VALUE 315 | SUB-ACCOUNTS 320 | | | | STATUS 325 | | FEE 330 |
|---|---|---|---|---|---|---|---|---|
| | | PAN 321 | $P 322 | RAN 323 | $R 324 | PAN 326 | RAN 327 | |
| R1 12345678 | $450.00 | | | | | | | $F1 |
| R2 98765432 | $1235.00 | | | | | | | $FA |

| SVCH IDENTIFIER (PIN) 310 | SVCH TOTAL VALUE 315 | SUB-ACCOUNTS 320 ||||| STATUS 325 || FEE 330 |
| --- | --- | --- | --- | --- | --- | --- | --- | --- |
| | | PAN 321 | $P 322 | RAN 323 | $R 324 | PAN 326 | RAN 327 | |
| 12345678 | $325.00 | 1142 | $P1 | 4522 | $R1 | OPEN | OPEN | $F1 |
| 98765432 | $1100.00 | 1183 | $PA | 2122 | $RA | OPEN | OPEN | $FA |

R1 (12345678 row)
R2 (98765432 row)

| SVCH IDENTIFIER (PIN) 310 | SVCH TOTAL VALUE 315 | SUB-ACCOUNTS 320 ||||| STATUS 325 || FEE 330 |
| --- | --- | --- | --- | --- | --- | --- | --- | --- |
| | | PAN 321 | $P 322 | RAN 323 | $R 324 | PAN 326 | RAN 327 | |
| 12345678 | $225.00 | 1142 | $P1 | 4522 | $R1 | OPEN | OPEN | $F1 |
| | | 1177 | $P2 | 8922 | $R2 | USED ONCE | OPEN | $F2 |
| | | ... | | | | | | |
| 98765432 | $1100.00 | 1183 | $PA | 2122 | $RA | OPEN | OPEN | $FA |

R1 (brace spanning first rows)
R2 (brace spanning last row)

FIG. 3C

ANONYMOUS REDEMPTION AND STORED VALUE SYSTEM AND METHOD

CROSS-REFERENCE TO A RELATED APPLICATION

This application is a continuation-in-part of the application having Ser. No. 09/652,932 filed Aug. 31, 2000, now abandoned.

BACKGROUND OF THE DISCLOSURE

1. Field of the Invention

The present invention relates to the field of stored value commerce systems and, more particularly, to a stored value commerce system capable of distributing value to anonymous users.

2. Description of the Background Art

Existing stored value systems typically provide a stored monetary value that may be utilized by consumers to purchase predefined goods and/or services. For example, stored value prepaid cards are currently used in prepaid telephone calling applications where the value associated with the stored value card may be consumed solely for the purchase of telephony services.

In the case of a stored value card retaining a residual value insufficient to purchase a reasonable amount of telephony services, the residual value is typically lost. Alternatively, even where the residual value of a stored value card is more than sufficient to procure goods and/or services, a user may simply wish to redeem the residual value as cash. The present state of the art provides no straightforward way to retrieve or redeem the residual value of the stored value card. Additionally, even if retrieval of such residual value were possible, there is no present method for anonymously retrieving such residual value.

SUMMARY OF THE INVENTION

These and other limitations associated with the prior art are overcome by the present invention of a stored value system enabling anonymous redemption of stored value, or anonymous purchases wherein the exposure of the stored value account holder is limited by an amount determined by the account holder.

In accordance with one broad method aspect of the present invention, a method for anonymously certifying a value from a stored value account associated with a stored value card holder (SVCH) includes: (a) submitting an authorization request to a stored value card provider (SVCP) from the SVCH to guarantee the value, the authorization request including an anonymous account identifier for the SVCH; and (b) sending an authorization response corresponding to the authorization request from the SVCP to the SVCH, the response including an anonymous user authorization number, distinct from the account identifier, provided by the SVCP and linked to the value whenever the value does not exceed the stored value in the account of the SVCH.

In accordance with another broad method aspect of the present invention, a method for anonymously certifying a value from a stored value account associated with a stored value card holder (SVCH) utilizing a trusted agent (TA) includes: (a) submitting a redemption request for the value to the TA, the redemption request including an Automated Teller Machine (ATM) account number of the SVCH with the TA, the identity of a stored value card provider (SVCP), and an anonymous account identifier of the stored value account of the SVCH with the SVCP; (b) transmitting a transfer request to the SVCP from the TA to guarantee the value, the transfer request including the TA's account number with the SVCP, and the SVCH's anonymous account identifier; (c) transferring the value to the TA's account with the SVCP whenever the balance in the stored value account is sufficient to guarantee the value; (d) debiting the value from the SVCH's account with the SVCP; and (e) crediting the SVCH's ATM account with the value by the TA.

System aspects of the present invention are commensurate with the method claims.

BRIEF DESCRIPTION OF THE DRAWINGS

A more complete understanding of the present invention may be obtained from consideration of the following description in conjunction with the drawings in which:

FIG. 3A is a representation of an exemplary SVCH database template in accordance with the principles of the present invention;

FIG. 3B depicts the template of FIG. 3A with data entries for single sub-accounts;

FIG. 3C depicts the template of FIG. 3A with data entries for multiple sub-accounts;

To facilitate understanding, identical reference numerals have been used, where possible, to designate identical elements that are common to the figures.

DETAILED DESCRIPTION

Figure 1A:
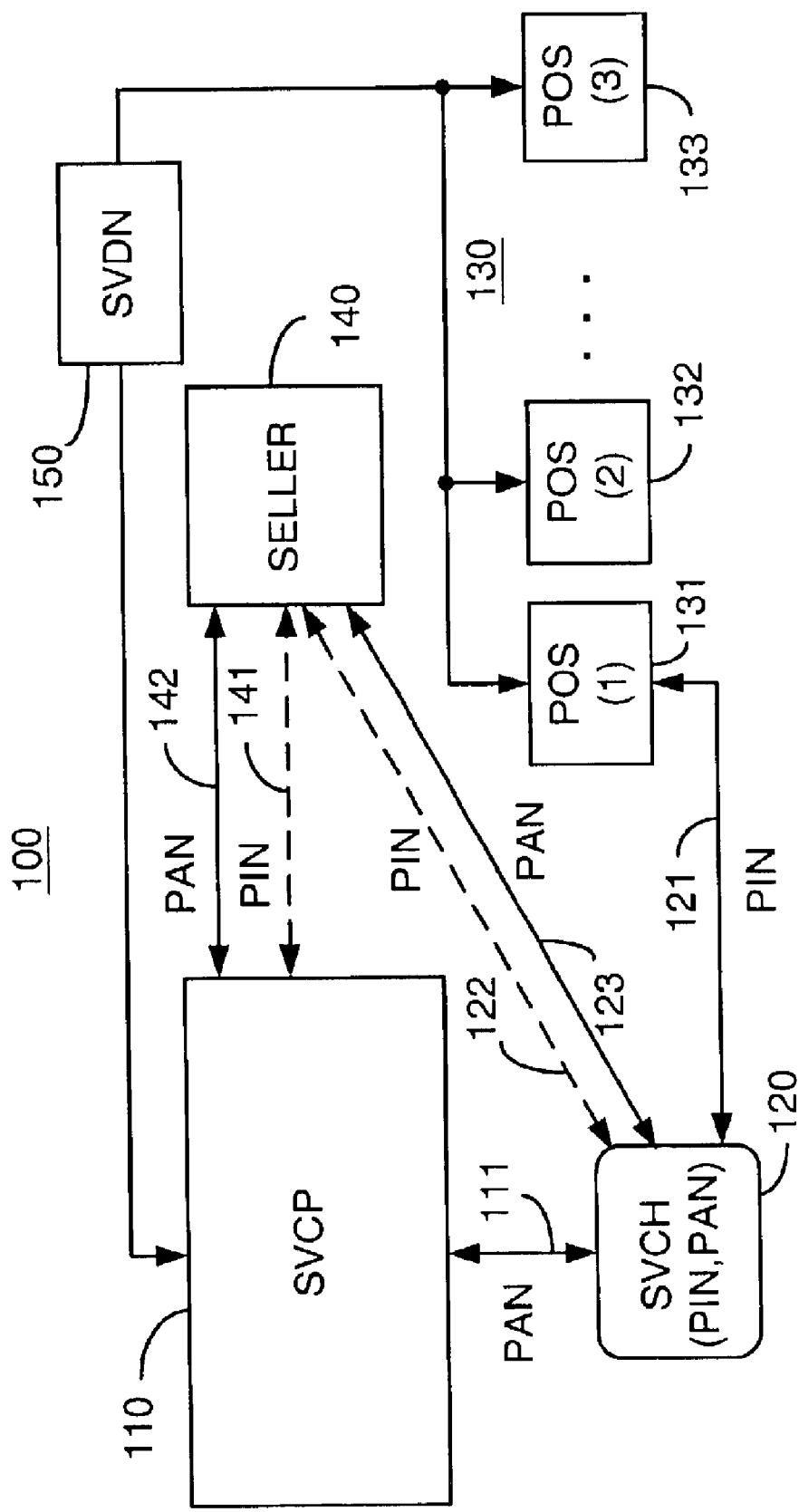
FIG. 1A is a block diagram of an exemplary embodiment of an anonymous stored value fulfillment system wherein a Stored Value Card Holder (SVCH) uses either a purchase identification number or a purchase authorization number for purchases.

In order to gain an insight into the fundamental principles in accordance with the present invention as well as to introduce terminology useful in the sequel, heuristic examples are first presented, followed by an elucidation of an illustrative embodiment.

HEURISTIC EXAMPLE 1

Envision a calling card application wherein an individual purchases, for cash, a prepaid telephone calling card from a calling card vendor, such as an office supply store—such an individual is then referred to as the cardholder. Typically the vendor is supplied with the calling card by a telephone service provider, so the vendor thus serves as an end-point distributor of the calling card. The service provider may be, for instance, a long distance telephone company. The provider facilitates access so the Public Switched Telephone Network (PSTN) for the cardholder, typically by having the cardholder first dial an access telephone number (e.g., an 800 number).

A unique identification number is imprinted on the prepaid calling card, and this identification number must be communicated by the cardholder to the provider, usually via the telephone keypad of the telephone used to access the provider, so that the provider may check the validity of the number. If valid, then the cardholder is asked to key-in the telephone number of the party to be called to thereby establish a talking path through the PSTN. If this call is the first one after the cardholder purchased the calling card then, upon completion of the call, the charge for the call ($c) is deducted from the original purchase price (say $X) allocated to the card to arrive at a balance ($b=$X−$c); each future call has its charge deducted from the balance $b, a variable. The balance is stored in a database of the provider along with the associated identification number.

It is clear from this conventional scenario that the cardholder remains anonymous to both the telephone service provider and the vendor, that is, there is no personal identification information (e.g., name, address, credit card, and so forth) linking the user to the calling card.

1.1 Use

Now suppose that the cardholder is willing to let, for example, a family member or friend—referred to as an authorized user—use the calling card. To accomplish this, it is necessary to convey the identification number to the authorized user. This, of course, may prove troublesome to the cardholder because the cardholder will no longer have sole knowledge of the identification number. The authorized user may misuse the privilege by using the card for more calls than authorized by the cardholder, or may, inadvertently or otherwise, impart the identification number to others not controlled by or even known to the cardholder. Such unauthorized users may, quite quickly, reduce the calling card balance to zero without even the knowledge of the cardholder.

Presently there is no known technique whereby the cardholder allows an authorized user to use the card, yet allows the cardholder to limit the cardholder's exposure to misuse by the authorized user or others.

In accordance with the principles of the present invention, suppose that the service provider offers an adjunct service whereby: (1) the cardholder requests that an amount of money (referred to as 'value') be deducted from the balance by the provider; and (2) a concomitant user authorization number corresponding to the value is then assigned by the provider and conveyed to the cardholder. A useful analogy for this scenario is one wherein a bank issues a bank check against a personal account; the amount of the check is guaranteed to be paid by the bank, and the amount of the check is deducted from the balance of the personal account even though the check has yet to be cashed. Moreover, the personal checking account number of the checking account holder does not appear on the bank check, so the account holder's personal information is not revealed. In view of this analogy, it is said that the service provider certifies the value to the cardholder.

The user authorization number is a unique number, distinct from the calling card identification number, which allows access to the service provider in the same manner as the calling card identification number, but limits the cardholder's exposure to misuse of the calling card. For example, in more specific terms, the cardholder may request that a value $V be allocated for use by an authorized user. The value $V is subtracted from the remaining balance so the new balance becomes $b_{new}$=$b_{old}$−$V, a user authorization number is associated with the value $V, and the user authorization number is conveyed to the cardholder via, for example, the telephone path used by the cardholder to access the provider. The cardholder informs, verbally or otherwise, the authorized user of the user authorization number, which is then used instead of the original identification number when placing a telephone call. Again, the cardholder and the authorized user remain totally anonymous. However, the cardholder knows two pieces of information, namely, the identification number and the user authorization number, but the authorized user knows only the user authorization number. The cardholder has unlimited use of the balance via the identification number, but the authorized user is limited to only the value $V. Thus, this technique advantageously partitions the users into two classes, as will be elaborated upon in the sequel.

It is apparent, in one case, that the value $V is equivalent to an original amount assigned to the authorized user, and each time the authorized user places a calling card call, the authorized user reduces any remaining balance from $V. Once there is no balance, the user identification number is no longer valid. In another case, it is possible that the user authorization number is only valid for one calling card call, and if there is any remaining balance, it generally will revert to the cardholder's account. The service provider, in order to keep track of an authorized user, associates at least one sub-account with the cardholder's account. The sub-account information includes, for instance, the user authorization number, the value $V initially, and the remaining balance if more than one call is allowed to be placed against the value $V.

It is readily contemplated that there may be many user identification numbers outstanding at any one time for a given cardholder. For instance, the cardholder may authorize a value $V1 for authorized user 1 (e.g., a spouse), and value $V2 for authorized user 2 (e.g., a child), and value $V3 for authorized user 3 (e.g., a friend). Thus there may be a plurality of active sub-accounts attached to a given cardholder. Moreover, it is clear that each authorized user (1, 2, or 3) may be allowed only one call or, alternatively, numerous calls, until the value $V1, $V2, or $V3, respectively, is depleted. The sub-accounts would then contain information indicative of the type of allowed service.

1.2 Redemption

Now further suppose that the service provider has implemented another adjunct service wherein the cardholder can redeem (say a cash amount $R) which is some or all of the balance in the account, that is, the amount $R is to be returned to the cardholder via a public end-point terminal arranged to dispense cash. There are techniques in related art, such as Automated Teller Machines, that allow the cardholder to redeem $R, but the cardholder must use the identification number. It may be desirable, for security reasons, not to utilize of the identification number at a public terminal. Again, it is possible to use the authentication number (now referred to as a redemption authorization number) in place of the identification number. This would be accomplished as follows: beforehand, the cardholder accesses the service provider via a private communication path (for example, by placing a telephone call to the provider's access number), and the cardholder requests that an amount $R be allocated from the balance for redemption. The amount $R is deducted from the balance, a redemption authorization number is linked to this amount, and the redemption authorization number is provided to the cardholder. Then the cardholder can visit the public cash-dispensing terminal, access the provider via the redemption authorization number, and request that the amount $R be issued as cash from the terminal; if the redemption authorization number is valid, the provider notifies the terminal to dispense the cash. Once the redemption authorization number is used, it is never deployed again. So even if the redemption authorization number is somehow intercepted, the interceptor will be foiled in an attempt to use the number because the redemption authorization number is voided once used.

On the other hand, it is possible to arrange the system so that the $R amount be drawn down upon in increments.

This technique of using a redemption authorization number in lieu of the identification number works equally as well with an authorized user(s) having the delegation of the cardholder. The authorized user is informed of only the redemption authorization number, so the cardholder's exposure is at most an amount $R, which is readily controlled by the cardholder.

HEURISTIC EXAMPLE 2

Consider extending the principles elucidated above to the case of merchandising goods and services. Again, suppose an individual anonymously purchases, for cash, an amount of stored value from merchandising provider via a vendor—the individual is now referred to as the purchaser. The vendor then issues a prepaid stored value card to the purchaser, which includes an imprinted purchaser identification number. The purchaser may then purchase goods and services from one or more sellers of goods and services served by the merchandising provider in the conventional manner.

Typically, to effect a purchase, the purchaser selects an item for purchase (say having a value $P), and submits the purchaser identification number to the seller for verification by the merchandising provider and, in turn, for authorization to the seller to complete the purchase transaction.

Again, analogous to the calling card example, the purchaser may desire to let another individual use the identification number for purchases. Instead, knowing that this has the potential for abuse by such user, the purchaser may request that an amount $V be allocated from the balance and assigned a user authorization number by the merchandising provider, and this authorization number may be conveyed to an authorized user in lieu of the identification number. The purchaser has thereby limited exposure to $V.

Also, in a manner similar to the calling card example, the purchaser may, for security purposes, only wish to use the authorization number when dealing with a seller and utilize the amount $V accordingly.

Moreover, the purchaser or an authorized user delegated by the purchaser may wish to redeem an amount $R from the purchaser's account. The issuance of a redemption authorization number certifying $R facilitates such redemption while limiting the purchaser's exposure.

HEURISTIC EXAMPLE 3

Consider now the situation wherein a conventional ATM is to be utilized for purposes of redeeming cash. The above examples imply that the redemption machine is specially configured for redeeming stored value without physically inserting a credit card into the redeeming device. Thus, in the above examples, presently known ATM machines used to redeem stored value will likely require modification in software and/or hardware to enable the ATM machines to recognize only a redemption authorization number (RAN) without physically inserting a credit card into the ATM's card scanner, to properly process a transaction using a RAN, and to issue a permissible amount of value (e.g., in the form of cash) to the cardholder.

To avoid modifications to existing ATMs for purposes of redeeming stored value, an alternative is to interpose a so-called "Trusted Agent" (TA) between the cardholder and the service provider. The TA is, illustratively, the entity or institution that provides the ATMs. From an operational viewpoint, the cardholder submits a request to the TA to redeem an amount $R, along with: (i) the unique identification number associated with the cardholder's stored value card; (ii) an ATM card number of the cardholder (or credit card number usable with the ATM) used to access the TA's ATM; and (iii) the identity of the service provider. The TA then submits, in lieu of the cardholder, a redemption request to the service provider (e.g., by utilizing the service provider's access number) for the amount $R; the only information supplied by the TA to the service provider includes the identity of the TA, an account associated with the TA and maintained with the service provider, and only the unique identification number of the cardholder, thereby ensuring the anonymity of the cardholder. The service provider certifies the amount $R (presuming it is available in the account of the cardholder) and transfers the amount $R to the TA's account with the service provider. Once the amount $R has been certified to the TA, the TA then transfers the amount $R into the cardholder's ATM account held in the TA's institution. The cardholder may now utilize any ATM managed by the TA, and withdraw the amount $R by inserting the ATM card, providing the ATM personal identification number, and requesting the amount $R to be dispensed from the ATM. The TA performs the necessary bookkeeping to register the withdrawal of the $R amount.

Suppose now that the cardholder wishes to delegate an authorized user to redeem the amount $R. Since the cardholder physically possesses his/her ATM card, and the authorized user may be geographically separated from the cardholder, it is necessary to devise a procedure whereby an ATM card of the authorized user can used in a TA's ATM machine in lieu of the cardholder's ATM card. It is presumed that the authorized user is willing to divulge his/her ATM card number to the cardholder, say via an oral communication—it is not necessary that the authorized user inform the cardholder of the authorized user's personal identification number associated with the authorized user's ATM card. The cardholder can then contact the TA, inform the TA of the authorized user's ATM account number, again say by a verbal communication, and request that the amount $R become associated with the ATM account of the authorized user. Accordingly, the TA transfers the amount $R to the authorized user's account, whereupon the authorized user can access a TA's ATM in the conventional manner.

DETAILS OF THE PRESENT INVENTION

The present invention is described within the context of a generic stored value system (encompassing the foregoing examples plus other scenarios readily contemplated by one of ordinary skill in the art) in which a Stored Value Card Holder (SVCH) utilizes a stored value card to purchase goods and/or services and, when desired, redeems some or all of a residual value of the stored value card at a Stored Value Redeeming Machine (SVRM) or Automatic Teller Machine (ATM) as cash. These transactions may be performed in an anonymous manner. The focus of the description is on the purchase and/or redemption via the use of an auxiliary number different than the usual identification number that issues with a stored value card.

1) Purchases with Purchase Identification Number (PIN)

With reference to FIG. 1A, there is shown a high-level block diagram 100 which is an exemplary embodiment of an anonymous stored value fulfillment system.

A Stored Value Card Provider (SVCP) 110 provides stored value cards to each of a plurality of point-of-sale (POS) terminals 131, 132, . . . , 133 (collectively POS terminals 130) via stored value card distribution network 150, denoted as SVDN, interposed between SVCP 110 and terminals 130. The point-of-sale terminals 130 may comprise automated stored value card selling units or human-assisted selling points in, for example, a store such as an office supply store. The point-of-sale terminals 130 may include facilities for printing stored value cards based upon information electronically received via the stored value card distribution network SVDN 150 comprising a communications or computer network, such as the public switched telephone network (PSTN) or the Internet. The stored value card distribution network SVDN 150 may also comprise a standard distribution network (i.e., common carrier, postal or other distribution means) for transporting pre-printed stored value cards to the POS terminals 130.

A Stored Value Card Holder (SVCH) 120 interacts with a point-of-sale terminal (illustratively POS 131) via a path 121. The SVCH 120 provides cash or a monetary equivalent to POS 131 in exchange for a similarly valued stored value card. The stored value card has an imprinted purchaser identification number (PIN) for the SVCH to effect purchases of goods and/or services in a conventional manner.

In particular, in the conventional purchasing scenario (which is shown by dashed paths), SVCH 120 interacts with seller 140 via a path 122 to purchase goods and/or services using the stored value card. For each purchase of goods and/or services, the value associated with the stored value card is reduced whenever the PIN submitted to Seller 140 is used to initiate and then verify the purchase with SVCP 110 via path 141. In this operational mode, SVCH 120 interacts indirectly with the Stored Value Card Provider 110 via Seller 140, over path 122 between the SVCH and the Seller, and over path 141 between the Seller and the SVCP.

2) Purchases with Purchase Authorization Number (PAN)

Again, recalling the main focus in accordance with the present invention, it is supposed that SVCH 120 desires, for security purposes, to make purchases via the stored value card, but does not wish to utilize the PIN. SVCH 120 then interacts directly with SVCP 110, via path 111, to request that an amount $P be certified, that is, be allocated from the remaining balance associated with the SVCH, and assigned a purchase authorization number (PAN) which is linked to the certified amount $P. In turn, the PAN is delivered to the SVCH over path 111.

Now, rather than use the PIN for purchases, the PAN may be used instead. The paths for the transaction using the PAN are shown as paths 123 and 142 in FIG. 1A (rather than paths 122 and 141 for the PIN transactions). It is readily contemplated that there are a number of possible scenarios, all within the scope of the present invention, when using a PAN for a purchase: (a) all of the $P may be used for the purchase, whereupon the PAN is no longer valid; (b) some of the $P is used for a present purchase, whereupon the remaining balance may be used for subsequent purchases; or (c) $P or the balance may be redeposited into the SVCH account to be used again in either the PIN or PAN mode.

Figure 1B:
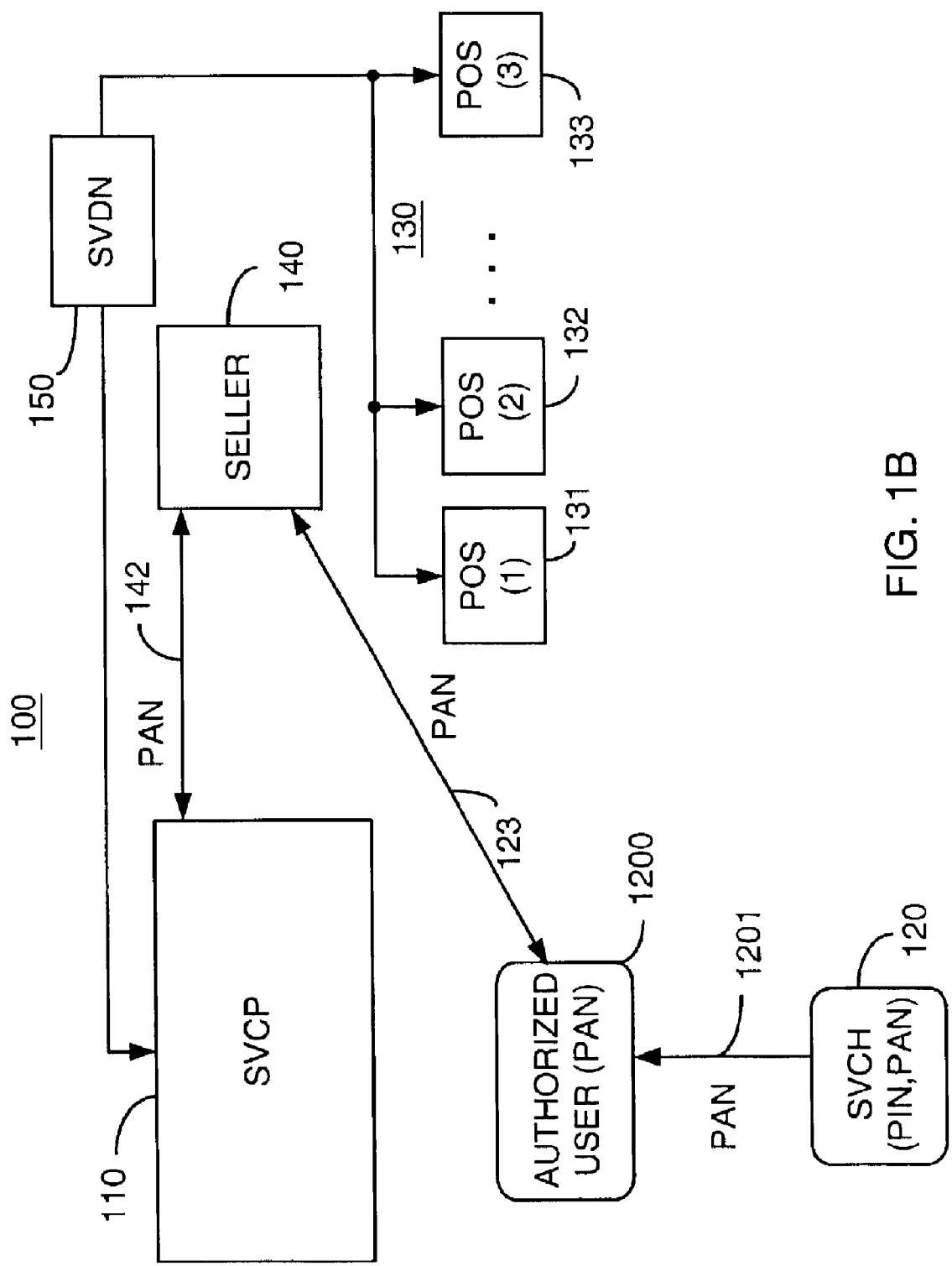
FIG. 1B is a block diagram of an exemplary embodiment of an anonymous stored value fulfillment system wherein a delegate of an SVCH uses a purchase authorization number for purchases.

If the SVCH desires to let an authorized user make purchases as a delegate for the SVCH, then the SVCH provides the authorized user, usually verbally, only the PAN. As per FIG. 1B, the authorized user 1200 is shown in relation to SVCH 120; path 1201 is used to communicate the PAN to user 1200. Then, the same paths to complete a purchase, namely, paths 123 and 142, convey the PAN utilized by the authorized user.

3) Redemption with Redemption Authorization Number (RAN)

Figure 1C:
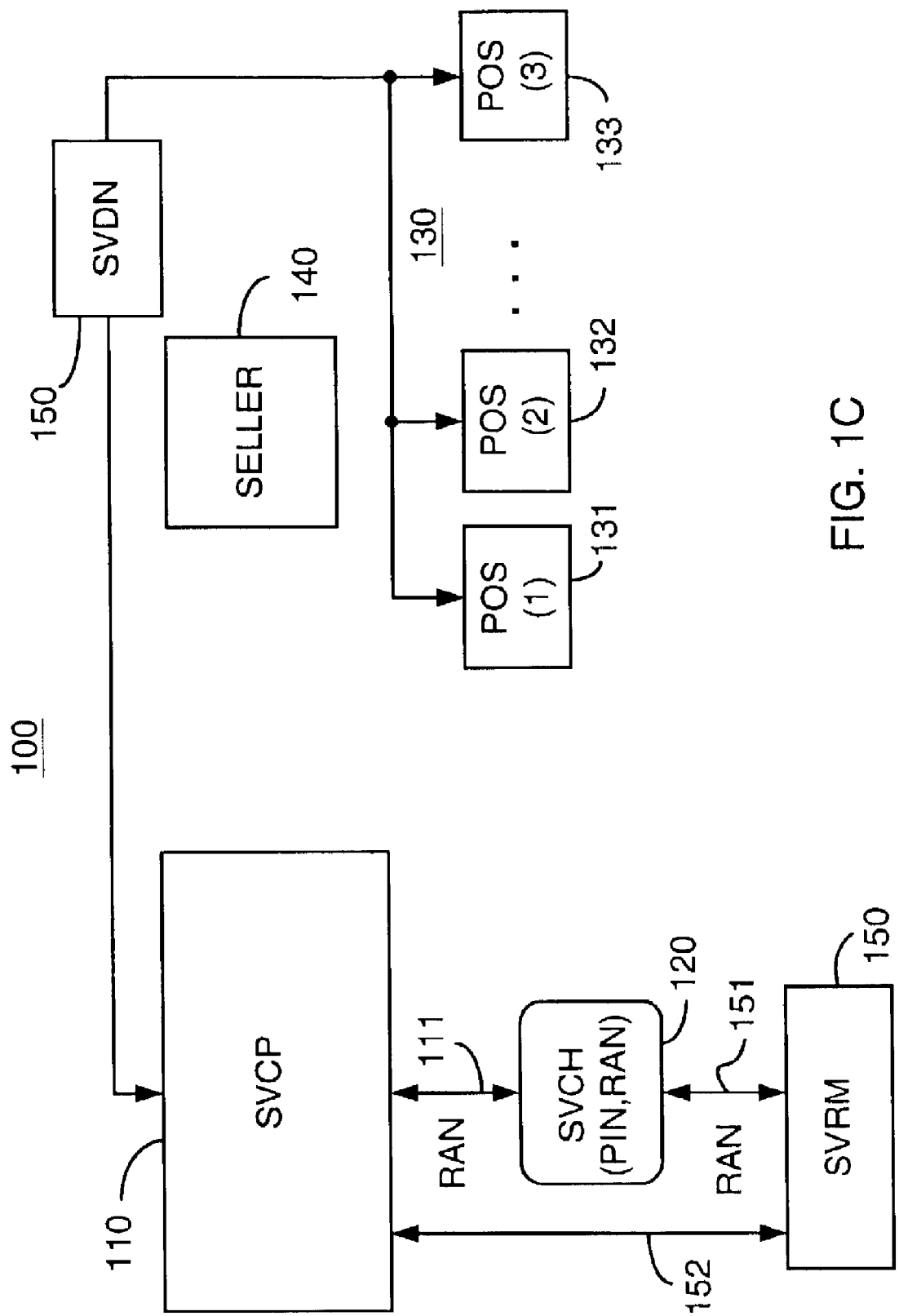
FIG. 1C is a block diagram of an exemplary embodiment of an anonymous stored value fulfillment system wherein an SVCH uses redemption authorization number to redeem cash from the SVCH's stored value account.

Now suppose that the SVCH desires to redeem an amount $R from the stored value account maintained for the SVCH. With reference to FIG. 1C, SVCH 120 then interacts directly with SVCP 110, via path 111, to request that a redemption amount $R be certified, that is, be allocated from the remaining balance associated with the account of the SVCH, and then be assigned a redemption authorization number (RAN) which is linked to the certified amount $R. In turn, the RAN is delivered to the SVCH over path 111. The SVCH 120 interacts with a Stored Value Redemption Machine (SVRM) 150 via path 151. The SVRM 150 interacts with the SVCP 110 via path 152. The SVRM is representative of numerous redemption terminals that are geographically dispersed and conveniently located for the dispensing of cash. The SVCH inputs the RAN into the SVRM requesting the issuance of a cash amount; typically this is the full amount $R certified by the RAN, but other scenarios are readily contemplated. If $R is authenticated, then the $R amount is dispensed from SVRM 150.

Figure 1D:
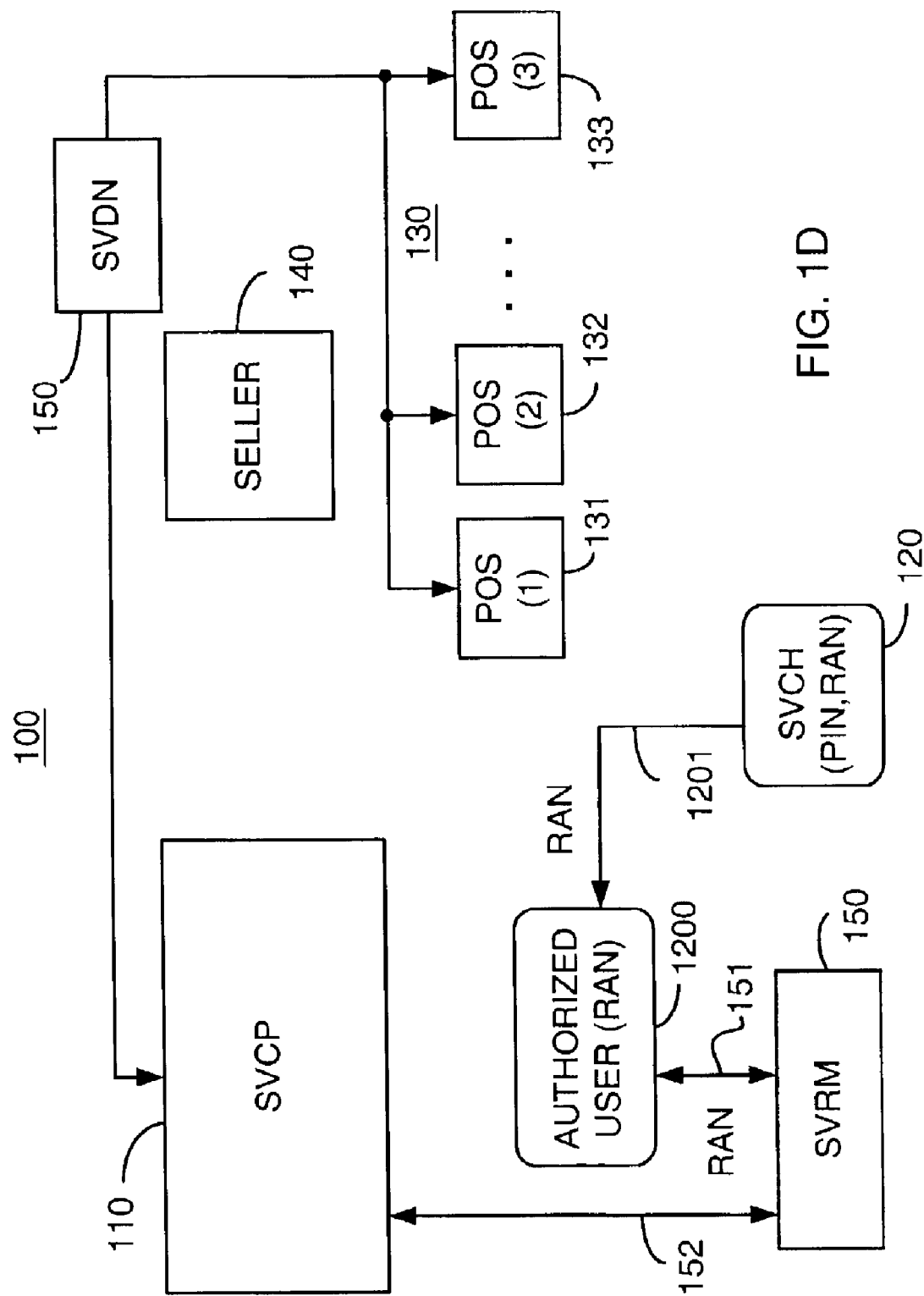
FIG. 1D is a block diagram of an exemplary embodiment of an anonymous stored value fulfillment system wherein a delegate of an SVCH uses a redemption authorization number to redeem cash from the SVCH's stored value account.

Now further suppose that an authorized user acting as a delegate of the SVCH desires to redeem cash. With reference to FIG. 1D, the SVCH imparts the RAN to authorized user 1200 via path 1201, typically via a verbal communication over the path. User 1200 can then interact with SVRM 150 in the same manner the SVCH did in FIG. 1C.

Methods for redeeming this remaining or residual value will be described in more detail below with respect to FIGS. 4–6.

It will be noted that while only a single SVCH 120 is depicted in FIGS. 1A–1D, those skilled in the art will appreciate that any number of Stored Value Card Holders may be supported using the present invention.

It is noted that the various communication paths (e.g., 111, 121–123, 141, 142, 151, 152) used to provide interaction between the above-described functional elements within the system 100 of FIGS. 1A–1D may be implemented using known communications technologies. For example, one or more of the public switched telephone network (PSTN), the internet, satellite networks, wireless networks and/or proprietary communication networks may be used to implement communications channels supporting the various communications paths as described above.

Figure 2:
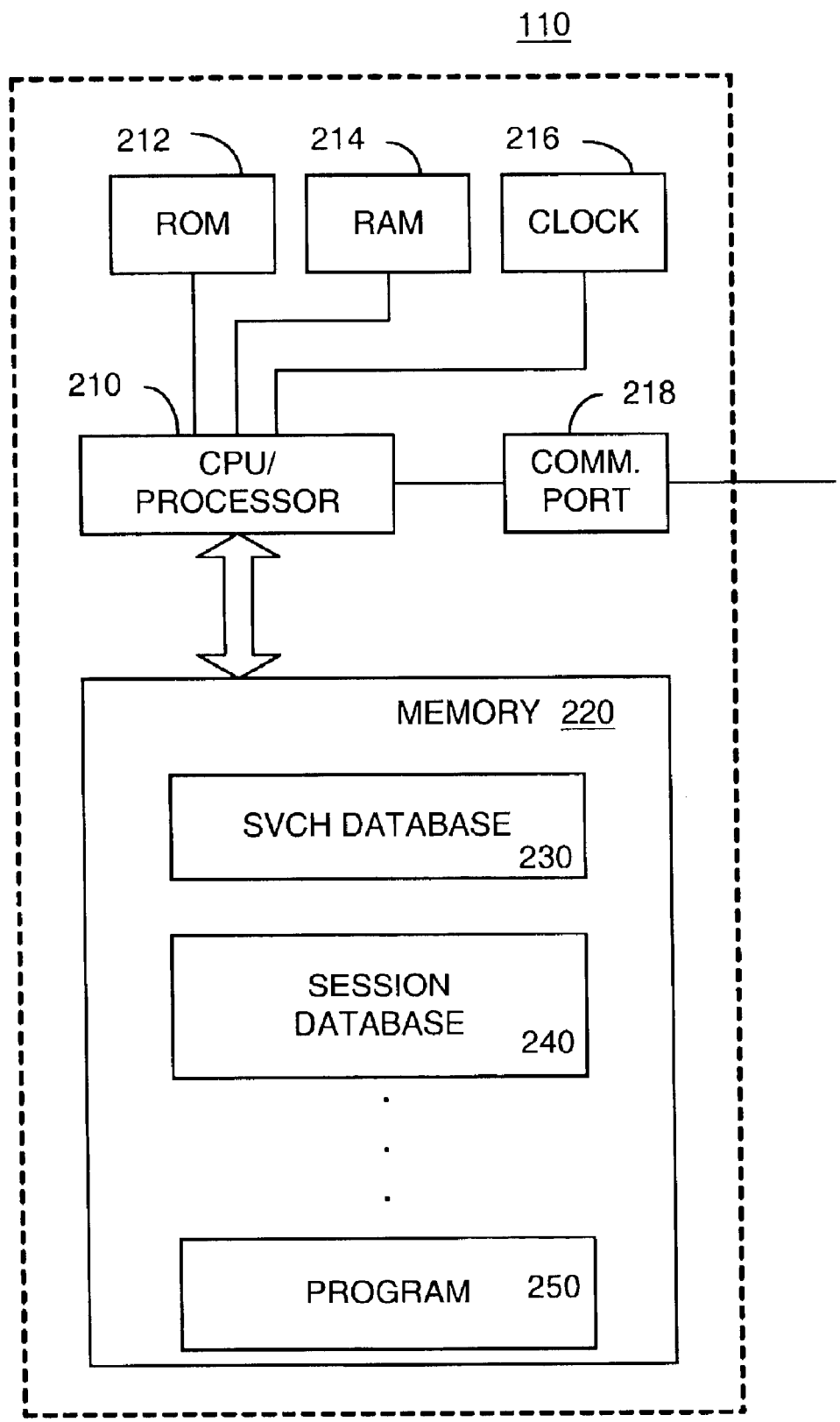
FIG. 2 is a block diagram of an exemplary embodiment of a Stored Value Card Provider (SVCP) suitable for use in the system of FIG. 1.

FIG. 2 is a block diagram of an exemplary embodiment of Stored Value Card Provider (SVCP) 110 server suitable for use in the system of FIGS. 1A–1D. The SVCP 110 preferably includes certain standard hardware components, such as Central Processing Unit (CPU) 210, data storage device or memory 220, read-only memory (ROM) 212, random access memory (RAM) 214, clock 216 and communications port 218. CPU 210 is preferably linked to each of the other listed elements, either by means of a shared data bus, or dedicated connections, as shown in FIG. 2. CPU 210 may be embodied as a single processor, or a number of processors operating in conjunction with one another. Data storage device 220 and/or a ROM 212 are operable to store one or more instructions which the CPU 210 is operable to retrieve, interpret and execute. CPU 210 preferably includes (but not shown as being conventional) a control unit, an arithmetic logic unit and a CPU local memory storage device, such as, for example, a stackable cache or a plurality of registers, in a known manner. The control unit is operable to retrieve instructions from the data storage device 220 or ROM 212. The arithmetic logic unit is operable to perform a plurality of operations needed to carry out instructions. The CPU local memory storage device is operable to provide high-speed storage used for storing temporary results and control information.

Memory 220 typically includes one or more machine-readable media; such media includes, as is well known in the art, magnetic, semi-conductor and/or optical media. Memory 220 is preferably capable of supporting the searching and storing of data. Memory 220, or portions thereof, may reside on a single computer or server, or may be distributed in a known manner among a plurality of computers or servers.

Memory 220 preferably includes a Stored Value Card Holder (SVCH) database 230, a session database 240 as well as other application code and programs 250 resident in the memory 220. SVCH database 230 preferably includes SVCH specific data pertaining to SVCH sub-accounts, as described in greater detail in conjunction with FIG. 3. Session database 240 preferably includes session specific data pertaining to the accessing and consumption of stored value by an anonymous Stored Value Card Holder or authorized user.

Communications port 218 connects the SVCP 110 to the other functional elements that interact with the SVCP 110, as previously described above with respect to FIGS. 1A–1D.

Referring now to FIG. 3A, there is shown a representation of a template exemplifying SVCH database 230 used in accordance with the principles of the present invention. It is understood that the various rows and columns illustrated as comprising the databases in this figure represent records and fields, respectively. Thus, in each of the various described embodiments, the databases are used in a relational arrangement, as is known in the art, so that the databases relate to one another by way of fields that store common pertinent data. It is noted that while the following description refers to specific individual data bases, formats, records, and fields, those skilled in the art will readily appreciate that various modifications and substitutions may be made thereto without departing from the spirit and the scope of the present invention.

SVCH data base 230 stores data relating to SVCH accounts that are maintained for anonymous account holders. Each record, or row, of the SVCH database 230 is maintained for one such anonymous account holder known only by an identification number. By way of example, two SVCH account records are shown in FIG. 3A; one is owned by an anonymous account holder having identification number (PIN) 12345678 in row R1, and a second is owned by an anonymous account holder having identification number 98765432 in row R2. Each record comprises a plurality of fields, including field 310 which stores the PINs. Since the identification number stored in field 310 is not associated with a name or other personal identification information, the Stored Value Card Holder associated with the record remains anonymous.

Field 315 is an SVCH total value field, used to store a total present value of the SVCH account—thus it is a variable (as above, $b) that, initially, has the amount deposited into the stored value account, and a lesser amount as the initial amount is drawn down. For example, account holder 1 has a balance of $450.00, which is presumed to be the initial amount purchased by account holder 1.

Field 320 has four-sub-fields, namely, PAN (321) and associated $P (322), and RAN (323) and associated $R (324). Examples of entries are shown in FIGS. 3B and 3C.

Status field 325 is contains two sub-fields, namely, one for the status of the PAN (326) and another for the status of the RAN (327).

Field 330 is a fee schedule field used to indicate an initial service charge (if any) to be levied against the SVCH total value during an initial use of the stored value card (and/or a per use or purchase/redemption service charge to be levied for each subsequent use or redemption request.) By way of example, the account of the first row R1 has an initial service charge of $F1 (e.g., $2). Similarly, the account of the second row R2 is charged a $FA initial service.

FIG. 3B depicts data entries wherein: (a) account holder 1 has allocated an amount $P1 linked to PAN '1142', and $R1 linked to RAN '4522'; and (b) account holder 2 has allocated an amount $PA linked to PAN '1183', and $RA linked to RAN '2122'. As shown in status sub-fields 326 and 327, respectively, each PAN and RAN is 'OPEN', which means that the PAN and RAN are available but not yet used by the SVCH and/or an authorized user(s).

FIG. 3C depicts data entries wherein account holder 1 has further allocated an amount $P2 linked to PAN '1177', and $R2 linked to RAN '8922'. The second account holder's data remains the same. As shown in status sub-fields 326 and 327, respectively, the PAN and RAN for the first sub-account under account holder 1 are 'OPEN', but the PAN for the second sub-account has been 'USED ONCE', but still 'OPEN', whereas the RAN for the second sub-account has not yet been used and is still 'OPEN'

Figure 4A:
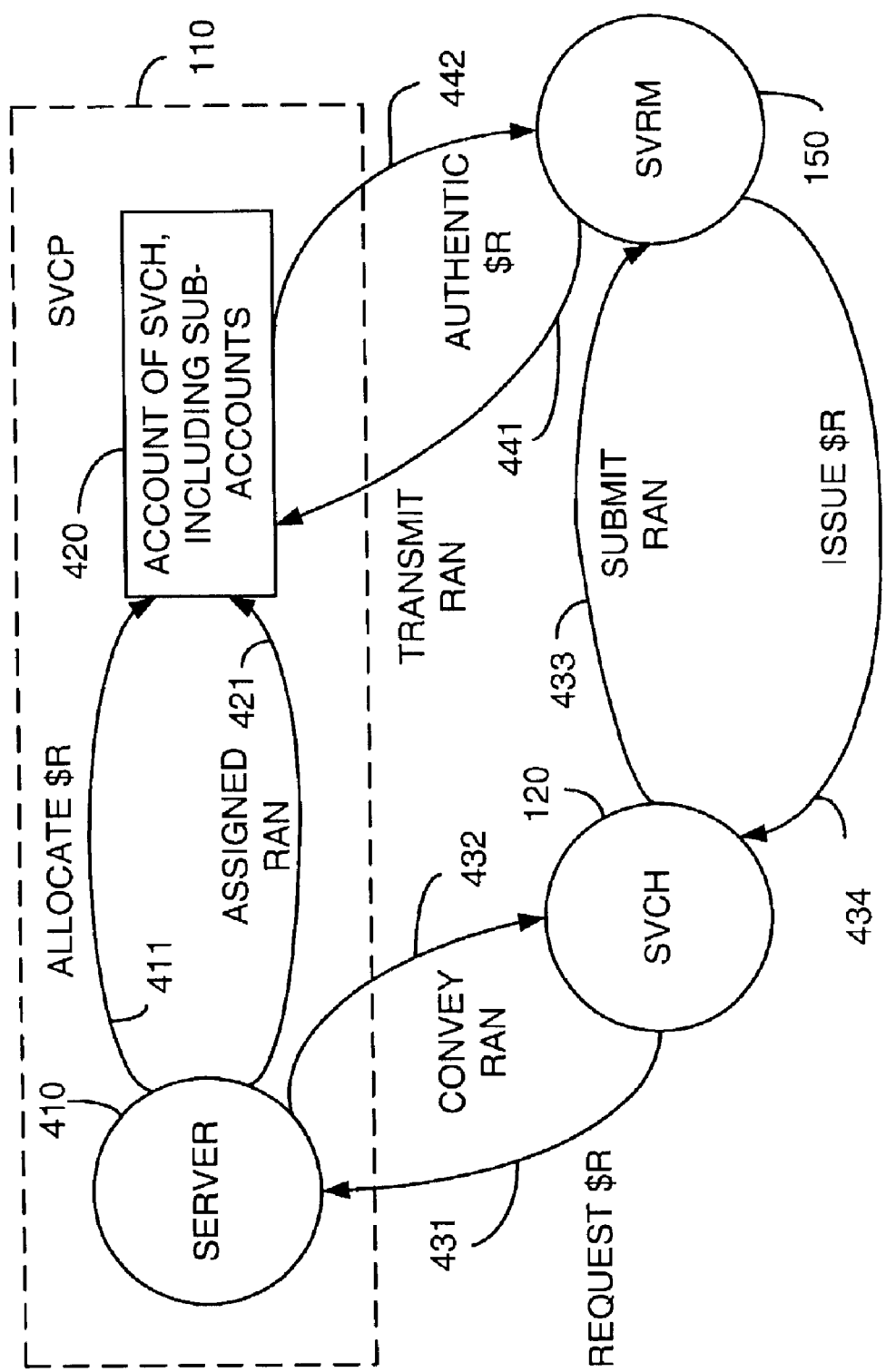
FIG. 4A depicts a relational diagram useful in understanding an embodiment of the invention wherein the SVCH redeems cash.

FIG. 4A depicts a relational diagram useful in understanding an embodiment of the invention. Specifically, FIG. 4A depicts a relational diagram useful in understanding the interactions between various functional elements depicted above in FIG. 1C—in particular, for use of the RAN by the SVCH. It will be clear from the description of FIG. 4A that use of a PAN is similarly described.

Relational Diagram for Use of RAN

The relational diagram of FIG. 4A depicts various interactions between or among Stored Value Card Provider 110, Stored Value Card Holder 120, and a Stored Value Redeeming Machine (SVRM) 150.

As conveyed by path 431, the SVCH requests that $R be allocated from the stored value account of the SVCH by the SVCP. SVCP 110 is shown as being composed of server 410 and account 420 associated with the SVCH. Server 410 generically encompasses, from FIG. 2, processor 210, ROM 212, RAM 214, clock 216, communications port 218, and programs 250. Account 420 is illustrated by record R1 of FIG. 3B. The SVCP allocates the $R from the balance in SVCH's account and assigns a RAN, and then the entries in account 420 are updated accordingly, as per paths 411 and 421.

As indicated by path 432, the RAN is conveyed to the SVCH. Now, via path 433, the SVCH, presently or at some later time, submits the RAN to the SVRM in order to redeem the amount $R. In turn, as per path 441, the RAN is transmitted to the SVCP to authenticate the RAN, that is, determine if the RAN is valid and look-up the amount $R which can issue for an authenticated RAN. If authentic, the SVCP authorizes the SVRM to dispense the $R to the SVCH, as per path 442. Finally, path 434 indicates that the $R amount issues to the SVCH.

Figure 4B:
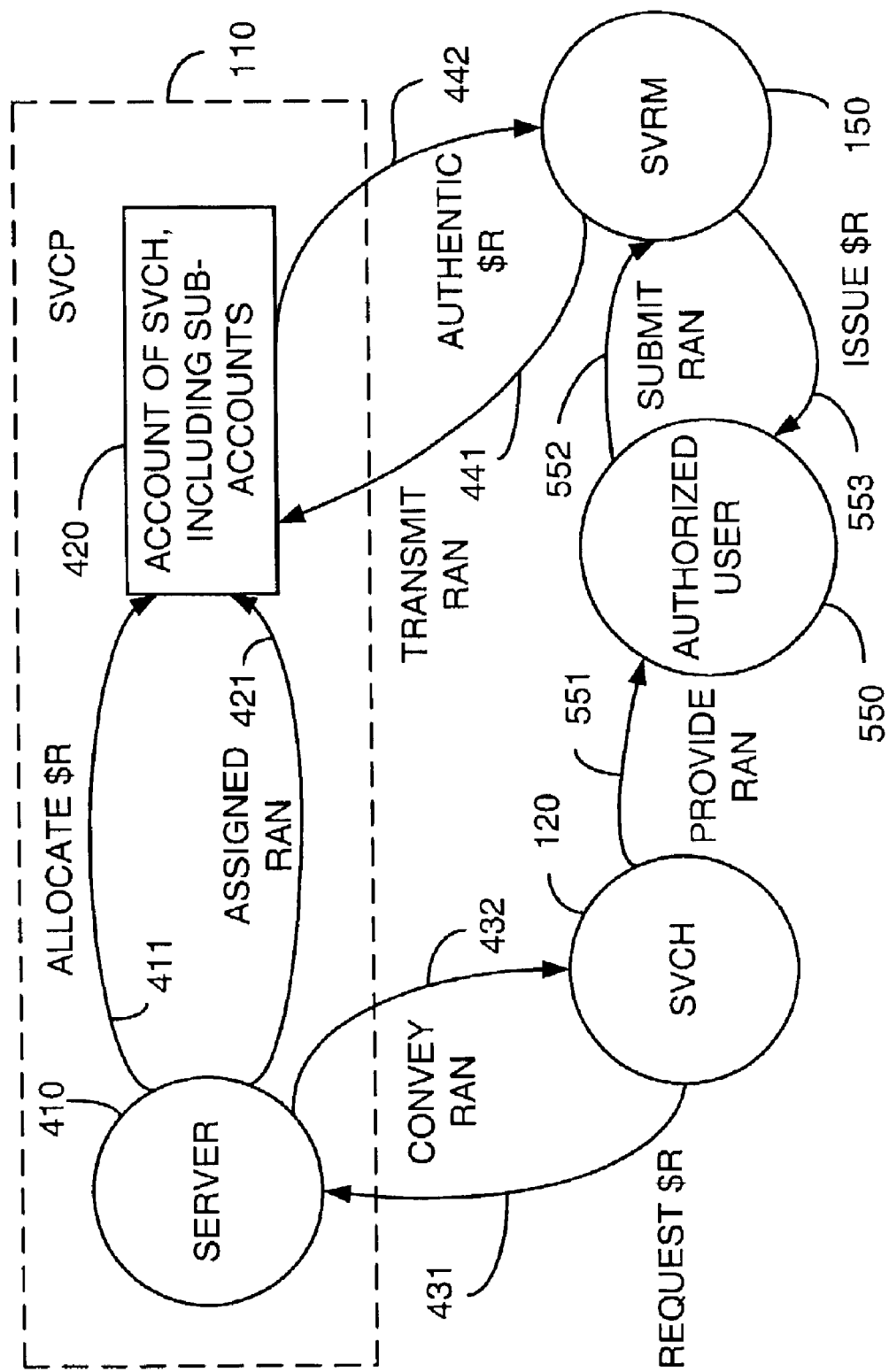
FIG. 4B depicts a relational diagram useful in understanding an embodiment of the invention wherein an authorized user redeems cash as a delegate of the SVCH.

FIG. 4B depicts a relational diagram commensurate with the description of FIG. 1D. In comparing FIG. 4A to FIG. 4B, the difference is the interposing of the authorized user 550 between SVCH 120 and SVRM 150. Rather than the SVCH submitting the RAN directly to the SVRM, the SVCH provides the RAN to user 550 as represented by path 551. Now, user 550 completes the steps of submitting the RAN to the SVRM (path 552) and receiving the $R from the SVRM (path 553).

Flow Diagram for Use of RAN

Figure 5:
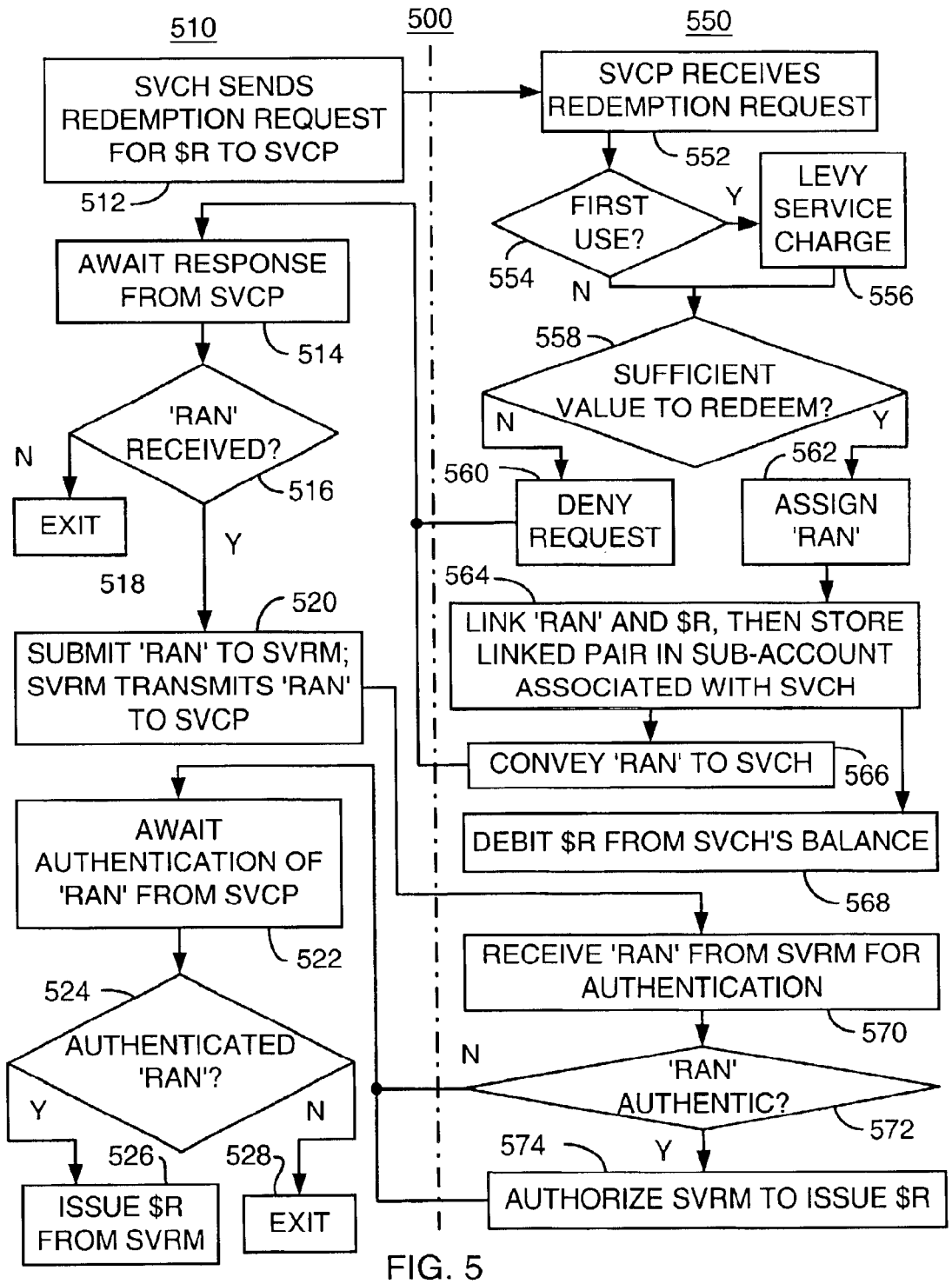
FIG. 5 depicts a flow diagram of a method of providing anonymous redemption of stored value.

FIG. 5 depicts flow diagram 500 of a method of providing anonymous redemption of stored value wherein a once-only request for $R is issued by the SVCH. Specifically, the method 500 of FIG. 5 depicts the actions of the SVCH in a first column 510 and the actions of the SVCP in a second column 550. The SVCH actions 510 comprise steps 512–528 (in increments of 2), while the SVCP actions 550 comprise steps 552–574 (in increments of 2).

Method 500 commences at step 512, when an SVCH sends a redemption request in the amount of $R to the SVCP, and at step 514 the SVCH goes into a wait mode to await a response from the SVCP.

At step 552, the SVCP receives the redemption request sent at step 512 for the $R amount. At step 554, a query is made as to whether the redemption request is a first request by the SVCH. If the query at step 554 is answered affirmatively, then at step 556 a surcharge is levied. Method 500 then proceeds to step 558. If the query at step 554 is answered negatively, then method 500 also proceeds to step 558.

At step 558, a determination is made if sufficient value exists for the value of the requested redemption. If sufficient value does not exist, then at step 560 a transaction failure message in the form of 'DENY REQUEST' is generated and propagated to the SVCH. If sufficient value does exist, then at step 562 a RAN for this redemption request is created. Moreover, as per step 564, the RAN and $R are linked, and the linked pair is stored in a sub-account for the SVCH.

At step 566 the RAN is conveyed to the SVCH. At step 568, the $R is debited from the balance of the SVCH; this debited amount may include a redemption fee.

At step 514, the SVCH receives either the transaction failure message or RAN communication from the SVCP. At step 516, a query is made as to whether a RAN or a transaction failure message was received. If a transaction failure message was received, then the method exits at step 518. If a transaction failure message was not received, then at step 520 the SVCH submits the RAN to SVRM and, in turn, the SVRM then transmits an authentication request to the SVCP. At step 522, the SVCH awaits, via the SVRM, a response to the authentication request.

At step 570, the SVCP receives RAN from the SVRM transmitted at step 520. At step 572, a determination is made if the RAN is authentic. If the RAN is authentic, via step 574, the SVCP issues an authorization to the SVRM to issue the $R amount.

At step 522, the SVCH receives a response to the submitted RAN. At step 524, a determination is made as to whether to issue $R, as per step 526, or to exit the method, as per step 528

The interactions described above with respect to FIG. 5 between the SVCH and SVCP are commensurate to those previously described with respect to FIG. 4A—with the former being a "relationship" view of the process, and the latter being the "flow diagram" view of the process.

Unifying Principles

Although the above discussion has presented the methodology and system in terms of a Stored Value Redeeming Machine, it is clear that an Automated Teller Machine (ATM) can be readily modified to achieve the functionality of the SVRM by simply modifying the underlying software operating the ATM. For instance, the opening menu on the ATM display screen may include an option for "stored value redemption" operation, which means that there is no need to enter the ATM card or other card with identifying information, therefore ensuring anonymity; the only entry is the RAN.

It is readily contemplated that both the PAN and RAN are special cases of what can be generically referred to as a 'user authorization number', which is quite distinct from the 'user identification number' or 'account identifier' (PIN). Moreover, a redemption or a purchase may be generically referred to as a transaction.

Utilization of a Trusted Agent to Redeem Stored Value

As alluded to above in Heuristic Example 3, to preclude modifications to existing ATMs, a Trusted Agent (TA) is utilized to facilitate redemption by the SVCH (or an authorized user in lieu of and with the delegation of the SVCH) while maintaining anonymity of the SVCH (or authorized user). The difficulty with a stored value card having only a unique identification number is that there is insufficient information for an ATM—an ATM requires both an ATM card having an imprinted/embossed number linked to an ATM account established at, say, a bank, as well as an associated ATM personal identification number (APIN) known to the ATM cardholder and not readable by the ATM's card scanner. In use, the ATM card is swiped by the card scanner, and then the PIN is entered via a keypad provided as part of the ATM to verify the identity of the ATM cardholder.

However, as postulated, the stored value card of the SVCH has only a unique identification number so as to maintain anonymity. Broadly, to effect redemption, if funds are transferred from the SVCH's account maintained by the service provider to the SVCH's ATM account maintained by the TA utilizing the services of the TA, then the SVCH can utilize his/her ATM card and APIN to redeem a stored value via a conventional ATM. Furthermore, the TA is presumed to maintain the anonymity of the SVCH even though the TA becomes aware of the identity of the SVCH via use of his/her ATM card. Moreover, the TA is presumed to control the ATM, so typically the TA is a bank or other similar institution that provides ATM services.

Relational Diagram for Use of Trusted Agent

Figure 6A:
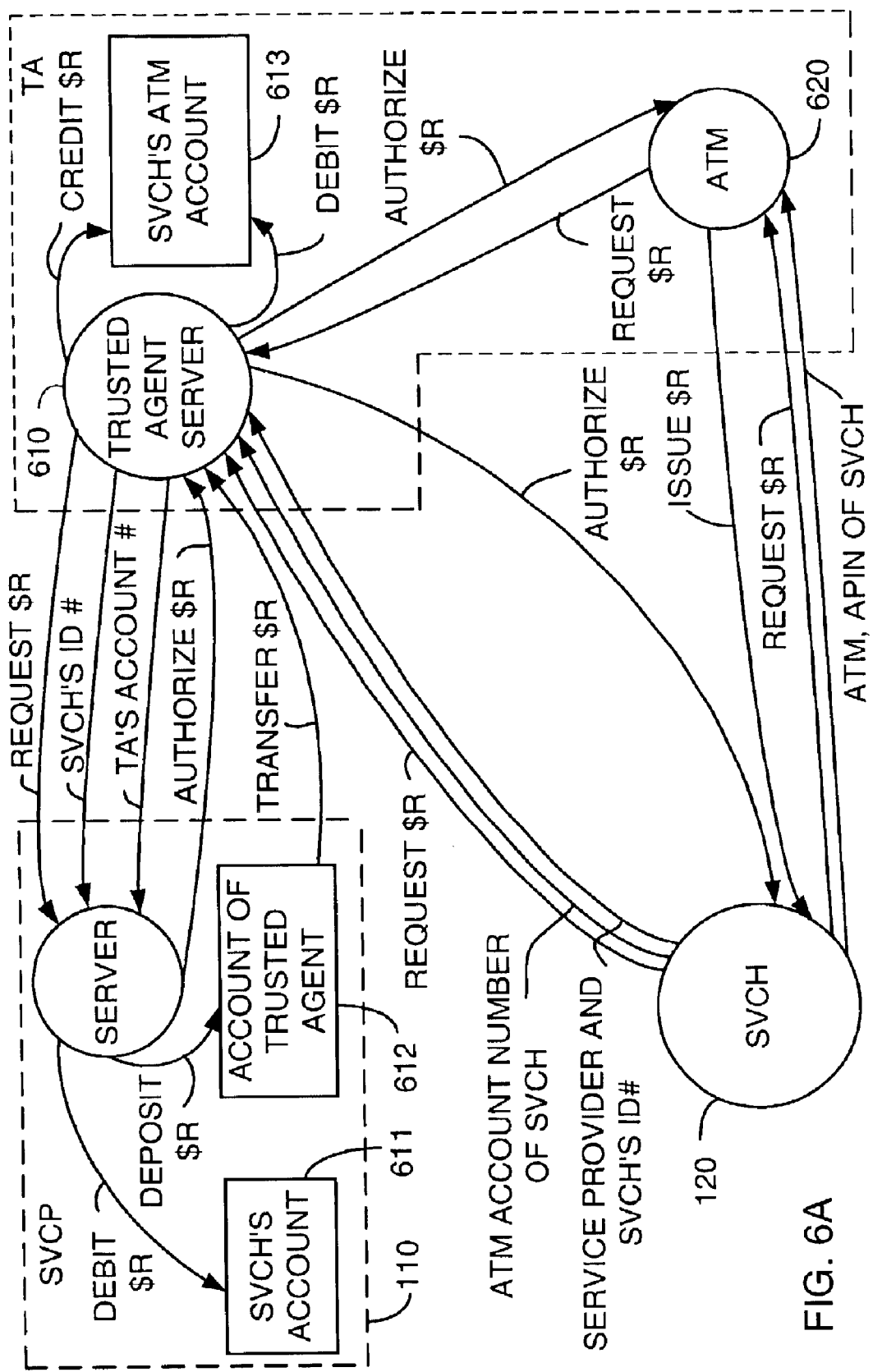
FIG. 6A is a relational/flow diagram wherein the SVCH utilizes the services of a Trusted Agent to redeem stored value.
Figure 6B:
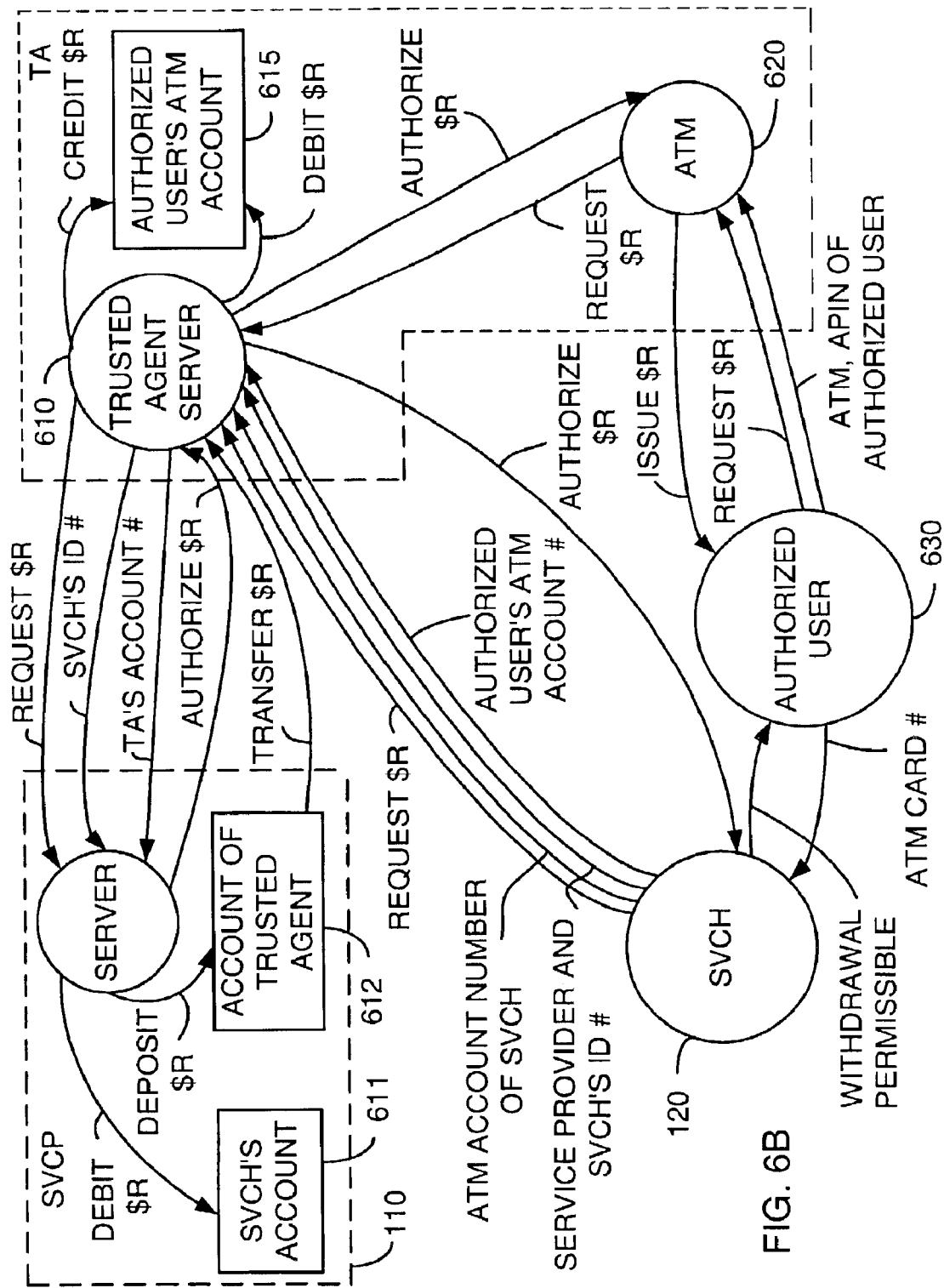
FIG. 6B is a relational/flow diagram wherein an authorized user, having the authorization of the SVCH, utilizes the services of a Trusted Agent to redeem stored value.

The relational diagram of FIG. 6A depicts various process flows among Stored Value Card Provider 110, Stored Value Card Holder 120, and Trusted Agent, represented by server 610, having storage for SVCH's ATM account 613 and in control of ATM 620. To start the redemption process, the SVCH initiates a request to the TA via, for illustrative purposes, a telephone conversation to the TA whereupon the SVCH imparts the following information: (i) the amount $R to be redeemed; (ii) the ATM account number of the SVCH; and (iii) the name of the service provider and the SVCH's unique identification number (SVCH's 1D #) for the stored value card in the possession of the SVCH. In turn, the TA requests the amount $R be redeemed from the SVCP and provides the identification number, and also provides the SVCP with information about an account (612) of the TA which is presumed to be maintained with the SVCP. The SVCP will determine if there are sufficient funds in the SVCH's account (611) to redeem the amount $R. If so, then the amount $R is debited from the account of the SVCH, and deposited into the account of the TA. Next, the TA is notified that the amount $R is redeemable (alternatively, a redemption denial is provided if there are insufficient funds). Presuming sufficient funds, the TA may then directly credit the amount $R to the SVCH's ATM account (613) from the TA's account (612). Alternatively, $R may be credited to the SVCH's ATM account (613) from any local account of TA. In this case the TA will transfer accumulated amounts in its SVCP account (612) to its local account at periodic intervals of time. The SVCH is notified, again via the same or a later phone conversation with the TA, that the amount $R is authorized for redemption. The SVCH may then visit an ATM machine controlled by the TA, such as ATM 620, and withdraw the amount $R using the SVCH's ATM card and APIN in the conventional manner. Once the amount $R issues, this amount is debited from the SVCH's ATM account.

Now consider the scenario of an authorized user (AU) possessing his/her own ATM card and APIN, and being geographically separated from the SVCH—it is desired that the AU be authorized to redeem an amount $R presently available in the SVCH's account with the SVCP, but physically using the AU's ATM card. Accordingly, with reference to FIG. 6B, there is shown a relational diagram for the case of authorized user 630 (AU) desiring to withdraw an amount $R under the authority of the SVCH. It is presumed that the AU is willing to provide, typically verbally, the AU's ATM account number (usually the ATM card number) to the SVCH, so the SVCH is a person having the trust of the AU. To start the redemption process for this case, the SVCH initiates a request to the TA via, as before, a telephone conversation to the TA whereupon the SVCH imparts the following information: (i) the amount $R to be redeemed by the AU; (ii) the ATM account number of the SVCH to verify that the SVCH is a customer of the TA; (iii) the name of the service provider and the SVCH's unique identification number for the stored value card in the possession of the SVCH; and (iv) the AU's ATM account number. In turn, the TA requests the amount $R be redeemed by the SVCH and provides the identification number, and also provides the SVCP with an account of the TA which is presumed to be maintained with the SVCP. The SVCP will determine if there are sufficient funds in the SVCH's account to redeem the amount $R. If so, then the amount $R is debited from the account of the SVCH, and deposited into the account of the TA. Next, the TA is notified that the amount $R is redeemable (alternatively, a redemption denial is provided if there are insufficient funds). Presuming sufficient funds, the TA may then directly transfer the amount $R to the AU's ATM account (615). Alternatively, $R may be credited to the AU's ATM account (615) from any local account of TA. In this case the TA will transfer accumulated amounts in its SVCP account (612) to its local account at periodic intervals of time. The SVCH is notified, again via the same or a later phone conversation with the TA, that this amount $R is authorized for redemption. The SVCH then informs the AU that a withdrawal amount $R has been credited to the AU's account, and the AU can withdraw the amount when desired. The AU may then visit an ATM machine controlled by the TA, such as ATM 620, and withdraw the amount $R using the AU's ATM card and APIN in the conventional manner. Once the amount $R issues, this amount is debited from the AU's ATM account.

Although the embodiments of the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements, which although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry, equipment, and systems embodying the principles of the invention.

What is claimed is:

1. A method for anonymously certifying a value from a stored value account associated with a stored value card holder (SVCH) comprising
    submitting an authorization request to a stored value card provider (SVCP) from the SVCH to guarantee the value, the authorization request including an anonymous account identifier for the SVCH, and
    sending an authorization response corresponding to the authorization request from the SVCP to the SVCH, the response including an anonymous user authorization number, distinct from the account identifier, provided by the SVCP and linked to the value whenever the value does not exceed the stored value in the account of the SVCH.

2. The method as recited in claim 1 which further includes utilizing the user authorization number in lieu of the account identifier for a purchase or a redemption limited to the value.

3. The method as recited in claim 2 wherein the user authorization number may only be used once, whereupon the user authorization number is voided.

4. The method as recited in claim 2 wherein the user authorization number may be used more than once to fully draw down the value.

5. The method as recited in claim 2 wherein an authorized delegate of the SVCH, in addition to the SVCH, may utilize the user authorization number for the purchase or the redemption.

6. The method as recited in claim 2 wherein the redemption is completed at a Stored Value Redeeming Machine or an Automated Teller Machine.

7. The method as recited in claim 1, in response to the submitting, further including generating a sub-account for the SVCH, the sub-account including the user authorization number associated with the value, the sub-account being utilized to track the purchase or the redemption.

8. The method as recited in claim 7 wherein a stored value card is initially purchased from a point-of-sale terminal by the SVCH for an initial value used to certify the value.

9. The method as recited in claim 8 which further includes providing the stored value card to a point-of-sale (POS) terminal, the POS terminal dispensing the stored value card to the SVCH in exchange for monetary consideration.

10. A method for anonymously redeeming a value from a stored value account associated with a stored value card holder (SVCH) comprising submitting an authorization request to a stored value card provider (SVCP) from the SVCH to redeem the value, the authorization request including an anonymous account identifier for the SVCH, sending an authorization response corresponding to the authorization request from the SVCP to the SVCH, the response including an anonymous redemption authorization number (RAN) provided by the SVCP and linked to the value whenever the value does not exceed the stored value in the account of the SVCH, transmitting a redemption request to a stored value redemption machine (SVRM), the redemption request including the RAN, and issuing the value to the SVCH from the SVRM in response to the redemption request.

11. The method as recited in claim 10 wherein the RAN may only be used once, whereupon the user authorization number is voided.

12. The method as recited in claim 10 wherein the RAN may be used more than once to fully draw down the value.

13. The method as recited in claim 10 wherein an authorized delegate of the SVCH, in addition to the SVCH, may utilize the RAN for the redemption.

14. The method as recited in claim 10, in response to the submitting, further including generating a sub-account for the SVCH, the sub-account including the RAN associated with the value, the sub-account being utilized to track the redemption.

15. The method as recited in claim 14 wherein a stored value card is initially purchased from a point-of-sale terminal by the SVCH for an initial value which is used to certify the value.

16. The method as recited in claim 15 which further includes providing the stored value card to a point-of-sale (POS) terminal, the POS terminal dispensing the stored value card to the SVCH in exchange for monetary consideration.

17. The method as recited in claim 10 wherein the redemption is completed at a Stored Value Redeeming Machine or an Automated Teller Machine.

18. A method for anonymously guaranteeing a value from a stored value account associated with a stored value card holder (SVCH) comprising submitting an authorization request to a stored value card provider (SVCP) from the SVCH to redeem the value, the authorization request including an anonymous account identifier for the SVCH, sending an authorization response corresponding to the authorization request from the SVCP to the SVCH, the response including an anonymous purchase authorization number (PAN) provided by the SVCP and linked to the value whenever the value does not exceed the stored value in the account of the SVCH, transmitting a purchase request from a seller to the SVCP, the purchase request including the PAN, and authorizing the purchase from the seller by the SVCP in response to the purchase request.

19. The method as recited in claim 18 wherein the PAN may only be used once, whereupon the user authorization number is voided.

20. The method as recited in claim 18 wherein the PAN may be used more than once to fully draw down the value.

21. The method as recited in claim 18 wherein an authorized delegate of the SVCH, in addition to the SVCH, may utilize the PAN for the purchase.

22. The method as recited in claim 18, in response to the submitting, further including generating a sub-account for the SVCH, the sub-account including the PAN associated with the value, the sub-account being utilized to track the purchase.

23. The method as recited in claim 22 wherein a stored value card is initially purchased from a point-of-sale terminal by the SVCH for an initial value which is used to certify the value.

24. The method as recited in claim 23 further including providing the stored value card to a point-of-sale (POS) terminal, the POS terminal dispensing the stored value card to the SVCH in exchange for monetary consideration.

25. A method for anonymously certifying a value from a stored value account associated with a stored value card holder (SVCH) comprising submitting an authorization request to a stored value card provider (SVCP) from the SVCH to guarantee the value, the authorization request including an anonymous account identifier for the SVCH, generating an anonymous user authorization number provided by the SVCP and linked to the value whenever the value does not exceed the stored value in the account of the SVCH, creating a sub-account for the SVCH to store the user authorization number and the sub-account associated value, sending an authorization response corresponding to the authorization request from the SVCP to the SVCH, the response including the anonymous user authorization number provided by the SVCP, and utilizing the user authorization number in lieu of the account identifier for a purchase or a redemption as tracked by the sub-account.

26. A computer readable medium having computer executable instructions for performing steps comprising receiving an authorization request by a stored value card provider (SVCP) from a stored value card holder (SVCH) to guarantee the value, the authorization request including an anonymous account identifier for the SVCH, and sending an authorization response corresponding to the authorization request from the SVCP to the SVCP, the response including an anonymous user authorization number provided by the SVCP and linked to the value whenever the value does not exceed the stored value in the account of the SVCH, the user authorization number being used in lieu of the account identifier for a purchase or a redemption limited to the value.

27. A Stored Value Card Provider (SVCP) server comprising:

a storage device; and a processor coupled to the storage device;

said storage device storing a program for controlling said processor, said processor operative with said program to perform the steps of:

receiving an authorization request by the SVCP from a stored value card holder (SVCH) to guarantee the value, the authorization request including an anonymous account identifier for the SVCH, and sending an authorization response corresponding to the authorization request from the SVCP to the SVCH, the response including an anonymous user authorization number provided by the SVCP and linked to the value whenever the value does not exceed the stored value in the account of the SVCH, the user authorization number being used in lieu of the account identifier for a purchase or a redemption limited to the value.

28. A system comprising a Stored Value Card Provider (SVCP), having associated with the SVCP at least one stored value card holder (SVCH) with a pre-paid account, for providing a redemption authorization request (RAN) to the SVCH in response to a request from the SVCH to redeem a value from the account, the RAN being linked to the value and being distinct from the SVCH's account identifier, and a Stored Value Redeeming Machine (SVRM) for receiving the RAN from the SVCH, for providing to the SVCP a redemption authentication request, and for issuing the value to the SVCH upon authentication.

29. A method for anonymously certifying a value from a stored value account associated with a stored value card holder (SVCH) utilizing a trusted agent (TA), the method comprising submitting a redemption request for the value to the TA, the redemption request including an Automated Teller Machine (ATM) account number of the SVCH with the TA, the identity of a stored value card provider (SVCP), and an anonymous account identifier of the stored value account of the SVCH with the SVCP, transmitting a transfer request to the SVCP from the TA to guarantee the value, the transfer request including the TARs account number with the SVCP, and the SVCH's anonymous account identifier, transferring the value to the TA's account with the SVCP whenever the balance in the stored value account is sufficient to guarantee the value, debiting the value from the SVCWs account with the SVCP, and crediting the SVCH's ATM account with the value by the TA.

30. The method as recited in claim 29 further including withdrawing the value by the SVCH from any ATM controlled by the TA, and debiting the SVCH's ATM account with the value withdrawn.

31. A method for anonymously certifying a value from a stored value account associated with a stored value card holder (SVCH) utilizing a trusted agent (TA), the value being credited to an authorized user delegated by the SVCH, the method comprising submitting a redemption request for the value to the TA, the redemption request including an Automated Teller Machine (ATM) account number of the authorized user with the TA, the identity of a stored value card provider (SVCP), and an anonymous account identifier of the stored value account of the SVCH with the SVCP, transmitting a transfer request to the SVCP from the TA to guarantee the value, the transfer request including the TA's account number with the SVCP, and the SVCH's anonymous account identifier, transferring the value to the TA's account with the SVCP whenever the balance in the stored value account is sufficient to guarantee the value, debiting the value from the SVCH's account with the SVCP, and crediting the authorized user's ATM account with the value by the TA.

32. The method as recited in claim 31 further including withdrawing the value by the authorized user from any ATM controlled by the TA, and debiting the authorized user's ATM account with the value withdrawn.

* * * * *